(12) United States Patent
Leone et al.

(10) Patent No.: US 7,957,888 B2
(45) Date of Patent: *Jun. 7, 2011

(54) APPROACH FOR ENHANCING EMISSIONS CONTROL DEVICE WARMUP IN A DIRECT INJECTION ENGINE SYSTEM

(75) Inventors: Thomas G. Leone, Ypsilanti, MI (US); Donald J. Lewis, Vancouver, WA (US); Robert A. Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,552

(22) Filed: May 10, 2010

(65) Prior Publication Data

US 2010/0217503 A1 Aug. 26, 2010

Related U.S. Application Data

(63) Continuation of application No. 12/124,000, filed on May 20, 2008, now Pat. No. 7,720,592.

(51) Int. Cl.
*F02D 41/00* (2006.01)
*F02B 13/00* (2006.01)
*F02D 41/30* (2006.01)
(52) U.S. Cl. ........................................ 701/103; 123/575
(58) Field of Classification Search .......... 701/103–105; 123/1 A, 575, 576, 578, 305, 299; 60/274, 60/276, 285
See application file for complete search history.

(56) References Cited

U.S. PATENT DOCUMENTS

| 6,185,929 | B1 | 2/2001 | Ishizuka et al. | |
|---|---|---|---|---|
| 7,426,925 | B2 | 9/2008 | Leone et al. | |
| 7,720,592 | B2 * | 5/2010 | Leone et al. | 701/103 |

OTHER PUBLICATIONS

Ikoma, Takuya. et al., "Development of V-6 3.5-liter Engine Adopting New Direct Injection System," SAE Technical Papers, No. 2006-01-1259, 2006 SAE World Congress, Apr. 3-6, Detroit, Michigan, 13 pages.
Landenfeld, Tilo. et al., "Gasoline Direct Injection—SULEV Emission Concept," SAE Technical Papers, No. 2004-01-0041, 2004 SAE World Congress, Mar. 8-11, Detroit, Michigan, 12 pages.
Morita, Koji. et al., "Emission Reduction of a Stoichiometric Gasoline Direct Injection Engine," SAE Technical Papers, No. 2005-01-3687, Powertrain & Fluid Systems Conference and Exhibition, Oct. 24-27, 2005, San Antonio, Texas, 7 pages.
Zhao et al., from text of, "Automotive Gasoline Direct-Injection Engines," SAE Technical Papers, p. 167-169, 1 page.

* cited by examiner

*Primary Examiner* — Hieu T Vo
(74) *Attorney, Agent, or Firm* — Allan J. Lippa; Alleman Hall McCoy Russell & Tuttle LLP

(57) ABSTRACT

A method of controlling fuel supplied to an engine of a vehicle is provided. The method may improve engine starting during cold operating conditions. In one example, the type of fuel injected to the engine is changed in response to operating conditions.

20 Claims, 6 Drawing Sheets

APPROACH FOR ENHANCING EMISSIONS CONTROL DEVICE WARMUP IN A DIRECT INJECTION ENGINE SYSTEM

CROSS REFERENCE TO RELATED APPLICATION

The present application is a continuation of U.S. patent application Ser. No. 12/124,000, filed May 20, 2008, now U.S. Pat. No. 7,720,592 B2, issued on May 18, 2010, entitled "APPROACH FOR ENHANCING EMISSIONS CONTROL DEVICE WARMUP IN A DIRECT INJECTION ENGINE SYSTEM", the entire contents of which are incorporated herein by reference.

BACKGROUND AND SUMMARY

An engine of a vehicle may include a cylinder having a direct injection fuel injector and a port injection fuel injector. The port injection fuel injector may be supplied with gasoline only from a first fuel storage tank and the direct injection fuel injector may be supplied with ethanol only from a second fuel storage tank. This engine configuration is one example of what may be referred to as an ethanol boosted system which may be used to enhance engine operating efficiency and improve fuel economy performance. For example, under some conditions, the port injection fuel injector may inject a reduced amount of gasoline and the direct injection fuel injector may inject ethanol to abate engine knock which otherwise would be caused by operation at increased boost levels and/or compression ratios.

The inventors herein have recognized issues with the above approach. In particular, in the above engine configuration, at cold engine start start-up, an emissions control device of the vehicle may be at a temperature below an operational light-off temperature, and thus quick heating of the emissions control device may be desired to control vehicle emissions. However, at a cold engine start-up condition, direct injection of ethanol for combustion may result in unstable combustion or modest heat generation since ethanol may not vaporize at cold temperatures. Likewise, port injected gasoline for combustion may produce modest heat generation resulting in slower emissions control device warm-up.

At least some of the above issues may be overcome, in one approach, by a method of controlling fuel supplied to an engine of a vehicle, the vehicle including a first fuel storage tank to store a first type of fuel, a second fuel storage tank to store a second type of fuel, and an emissions control device, the engine including at least one cylinder having a direct injection fuel injector being selectively supplied with the first type of fuel from the first fuel storage tank and the second type of fuel from the second fuel storage tank, the method comprising: supplying the first type of fuel from the first fuel storage tank to the direct injection fuel injector in response an engine start condition of the vehicle; and supplying the second type of fuel from the second fuel storage tank to the direct injection fuel injector, in response to an increase in engine output exceeding a threshold increase or a temperature of the emissions control device exceeding a threshold temperature.

In one example, gasoline is supplied to the direct injection fuel injector at cold engine start-up and the direct injection fuel injector performs mild stratified injections of gasoline. In particular, at engine startup, gasoline may be preferable for direct injection over ethanol because gasoline vaporizes at cooler temperatures relative to ethanol. The vaporized gasoline may form a stratified mixture of air and fuel providing enhanced combustion stability that enables additional spark retard for increased exhaust heat. Thus, by supplying stratified gasoline via the direct injector at engine startup exhaust heat generation may be increased. In this way, an emissions control device may be heated to a light-off temperature in a quick manner.

Furthermore, upon the emissions control device reaching the light-off temperature, gasoline is no longer needed for heating of the emissions control device, thus ethanol is supplied to the direct injection fuel injector. Also, if the engine load increases to a substantially high load prior to the emissions control device reaching the light-off temperature, ethanol may be supplied to the direct injection fuel injector for knock suppression purposes. In particular, the directly injected ethanol may provide substantial charge cooling due to the higher heat of vaporization of ethanol resulting in suppression of engine knock. By suppressing engine knock, engine output may be increased without substantial engine degradation. In this way, the operating efficiency of the engine may be improved.

Accordingly, the above described approach may supply gasoline to the direct injection fuel injectors for improved emissions control device heating at engine startup. Then, the approach may transition to supplying ethanol to the direct injection fuel injectors to suppress engine knock and increase output. In this way, the vehicle emission may be reduced and operating efficiency may be increased.

DETAILED DESCRIPTION

Figure 1:
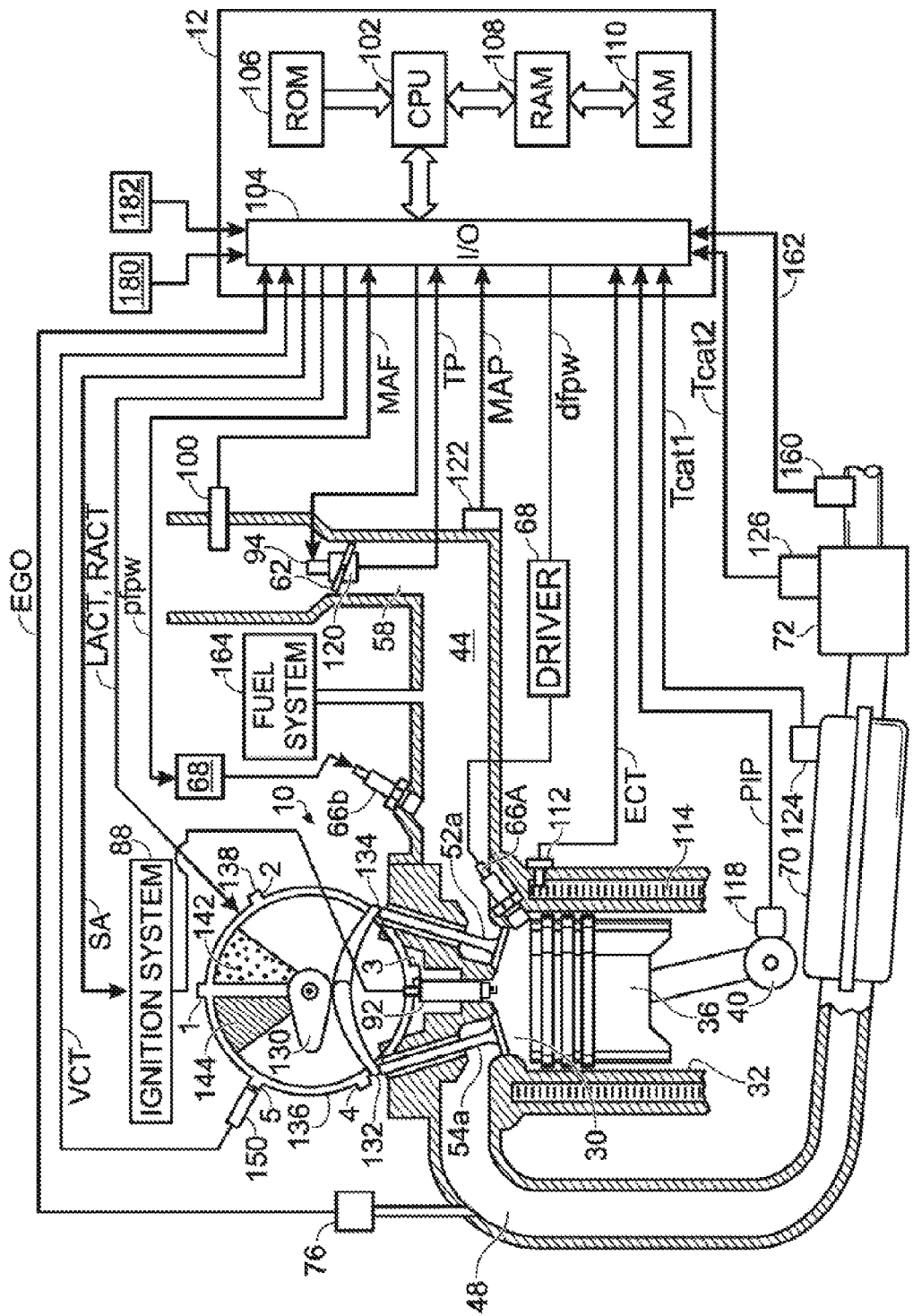
FIG. 1 is a schematic view of an embodiment of engine system of the present disclosure.

FIG. 1 shows one cylinder of a multi-cylinder engine, as well as the intake and exhaust path connected to that cylinder. In the embodiment shown in FIG. 1, engine 10 is capable of using two different fuels, and/or two different injectors in one example. For example, engine 10 may use gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), etc. In another example, two fuel systems are used, but each uses the same fuel, such as gasoline. In still another embodiment, a single injector (such as a direct injector) may be used to inject a mixture of gasoline and an alcohol based fuel, where the ratio of the two fuel quantities in the mixture may be adjusted by controller 12 via a mixing valve, for example. In still another example, two different injectors for each cylinder are used, such as port injection (PI) fuel injectors and direct injection (DI) fuel injectors. In even another embodiment, different sized injectors, in addition to different locations and different fuels, may be used.

As will be described in more detail below, various advantageous results may be obtained by variations of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock. This phenomenon, combined with increased compression ratio, and/or boosting and/or engine downsizing, can then be used to obtain large fuel economy benefits (by reducing the knock limitations on the engine).

FIG. 1 shows one example fuel system with two fuel injectors per cylinder, for at least one cylinder. Further, each cylinder may have two fuel injectors. The two injectors may be configured in various locations, such as two port injectors, two direct injectors, one port injector and one direct injector (as shown in FIG. 1), or others.

Continuing with FIG. 1, it shows a dual injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valve 52a, and exhaust valve 54a. Thus, while two valves per cylinder may be used, in another example, four valves per cylinder may be used. That is, two intake valves and two exhaust valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, in some embodiment the injector may be located overhead of the piston, such as near the position of spark plug 92. Such a position may improve mixing and combustion due to the lower volatility of some alcohol based fuels, and further may improve mixing and combustion of gasoline based fuel that is directly injected into the cylinder. Alternatively, the injector may be located overhead and near the intake valve to improve mixing.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44. Various fuel systems and fuel vapor purge systems may be used as well as EGR systems to improve vehicle operating efficiency.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation or during stoichiometric stratified mode of operation.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of catalytic converter 70 is provided by temperature sensor 124 and temperature Tcat2 of emission control device 72 is provided by temperature sensor 126. In an alternate embodiment, temperature Tcat1 and temperature Tcat2 may be inferred from engine operation.

Further, as shown in FIG. 2, controller 12 may receive signals from fuel sensor 238 and fuel sensor 240. The signals from fuel sensor 238 may provide an indication of an amount or level of fuel in first fuel storage tank 230 and the signals from fuel sensor 240 may provide and indication of an amount or level of fuel in second fuel storage tank 234.

Returning to FIG. 1, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valve 52a and exhaust valve 54a open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valve 52a and exhaust valve 54a open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may include a roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included in the operation, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As another example, the engine may operate in stratified fuel injection mode. In stratified fuel injection mode, the DI fuel injectors and/or the PI, combined or alone, may perform separate injection events during the intake stroke (for a homogeneous mixture which is approximately stoichiometric) and late in the compression stroke (to add extra fuel near the spark plug). The injections create locally rich mixture near the spark plug that improves combustion stability.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. As described in more detail below, adjustments may be made with injector 66A, 66B, or combinations therefore depending on various factors.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

Figure 2A:
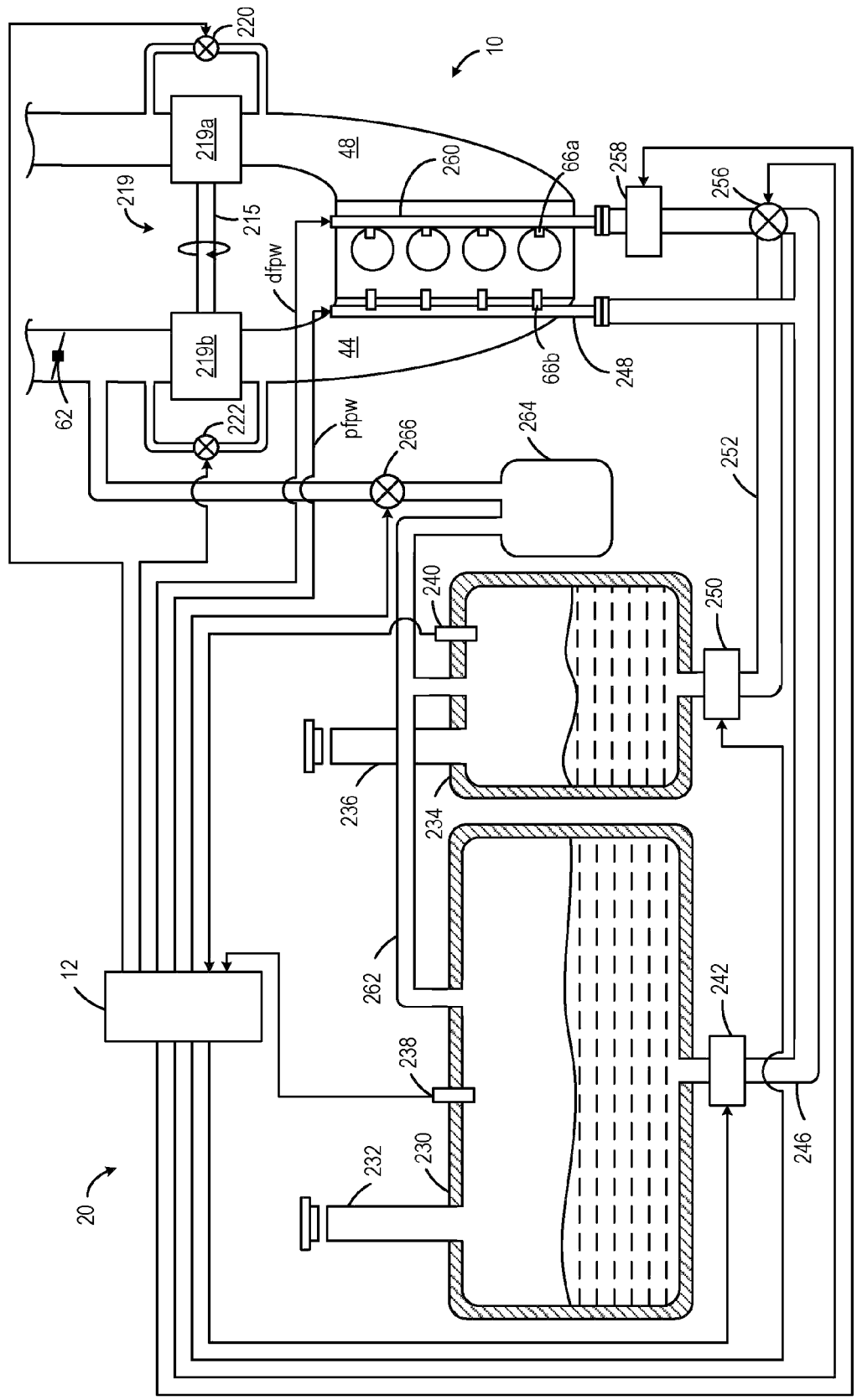
FIG. 2a is a schematic view of an embodiment of a fuel system in operative communication with an engine system of the present disclosure.

Referring now to FIG. 2a, an example engine 10 with four in-line cylinders and a corresponding fuel system 20 is shown. In one embodiment, engine 10 may have a turbocharger 219, which has a turbine 219a coupled in exhaust manifold 48 and a compressor 219b coupled in intake manifold 44. While FIG. 2a does not show an intercooler, one may optionally be used. Turbine 219a is typically coupled to compressor 219b via a drive shaft 215. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 2a shows an example bypass valve 220 around turbine 219a and an example bypass valve 222 around compressor 219b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used, if desired.

Fuel system 20 may deliver one or more different types of fuel to engine 10 via port injection (PI) fuel injectors 66B and/or direct injection (DI) fuel injectors 66A. The different fuel types may include fuels with different octanes, different heats of vaporization, different concentrations of a gasoline/alcohol mixture, combinations thereof, etc. In one example, the first type of fuel may include a 10% ethanol blend in gasoline, while in another example, the second type of fuel may include an 85% ethanol blend in gasoline. However, still other different types of fuel may be used.

In the illustrated embodiment, an example fuel system configuration is shown where a separate fuel pump and tank is provided for a first and second fuel type. Specifically, a first tank 230 is shown for holding liquid fuel of a first type. First tank 230 may receive the first fuel type via filler tube 232. Likewise, a second tank 234 to hold liquid fuel of a second type may receive the second fuel type via filler tube 236. In one example, the first tank contains gasoline, while the second tank contains an alcohol blend, such as ethanol or an ethanol-gasoline mixture. However, other fuel types may also be used. It will be appreciated that in some cases both the first and second fuel storage tanks may hold the same type of liquid fuel.

The liquid fuel level in fuel storage tanks 230 and 234 may be determined by controller 12 using sensor measurements. For example, sensor 238 may measure the fuel storage tank pressure of fuel storage tank 230 and a liquid fuel level of the first type of fuel may be derived from that pressure measurement. Likewise, sensor 240 may measure the fuel storage tank pressure of fuel storage tank 234 and a liquid fuel level of the second type of fuel may be derived from that pressure measurement. As another example, in some embodiments, a liquid fuel level measuring device (not shown) that floats on the surface of the liquid fuel in the tank may determine the volume of liquid fuel in the tank. It will be appreciated that an indication of the liquid fuel level may be provided to the driver based on a determination via measurement, calculation, or combination thereof. Controller 12 may generate a fuel level reading that may range between a full fuel storage tank and an empty fuel storage tank based on the received measurements and/or the determination. The indication may be displayed to the vehicle operator via a fuel level indicator (not shown) that may be used by the vehicle operator for fuel storage tank filling purposes.

Fuel system 20 further includes fuel vapor canister 264 that connects to fuel storage tanks 230 and 234 via vent pipe 262. Fuel vapor canister 264 may trap fuel vapor flowing into the canister while allowing air filtered through the canister to be vented to the atmosphere via an air vent (not shown). In some embodiments, the fuel vapor canister may filter fuel vapor with charcoal. The fuel vapor may adhere to the charcoal until the fuel vapor is purged.

Fuel vapor canister saturation may occur responsive to various operating conditions and events. In one example, fuel storage tank filling may force fuel vapor residing in the fuel storage tank into the canister causing canister saturation. As another example, heat and/or pressure generated during vehicle operation may cause liquid fuel to evaporate creating fuel vapor which may be transferred into the canister causing saturation.

In order to avoid over saturation of fuel vapor canister 264 and release of fuel vapor to the atmosphere, fuel vapor may be purged from fuel vapor canister 264 via purge valve 266 which may be actuated by controller 12. Fuel vapor may be purged from the fuel vapor canister using engine vacuum created during engine operation. In one example, engine vacuum may be created by actuating throttle valve 62 and upon actuation of purge valve 266; fuel vapor may travel from fuel vapor canister 264 into the intake manifold and enter cylinders of engine 10 for combustion. By introducing fuel vapor into the cylinder and not into the atmosphere fuel economy may be improved and emissions may be reduced. In some configurations, each fuel storage tank may have a separate vapor passage in communication with a shared fuel vapor canister. Further, in some configurations each fuel storage tank may have a separate fuel vapor passage in communication with a separate fuel vapor canister.

A first type of liquid fuel (e.g. gasoline) may be pumped from fuel storage tank 230 into passage 246 via pump 242. Passage 246 may lead to PI injector 66B via fuel rail 248 for port injection of the first fuel type to cylinders of engine 10 in what may be referred to as the port injection system. Further, passage 246 may lead to valve 256. In some embodiments, valve 256 is a solenoid valve. A second type of liquid fuel (e.g. ethanol, ethanol/gasoline) may be pumped from fuel storage tank 234 into passage 252 via low pressure pump 250. Passage 252 may lead to valve 256. Valve 256 may be actuated by controller 12 to selectively supply the first fuel type from fuel storage tank 230 or the second fuel type from fuel storage tank 234 to high pressure pump 258 which may provide fuel to DI fuel injector 66A via fuel rail 260 for direct injection of the first or second fuel to cylinders of engine 10 which may be referred to as the DI system. By selectively supplying each of the different fuel types to the DI fuel injectors, different combustion modes may be performed throughout engine operation that take advantage of the properties of the different types of fuel. For example, gasoline may be directly injected in a stratified combustion mode during engine startup in order to quickly warm up an emissions control device. As another example, ethanol may be directly injected during high engine loads to prevent engine knock. In this way, operating efficiency may be improved and emissions may be reduced over the range of engine operation.

Furthermore, by providing each of the different fuel types to the DI fuel injectors, liquid fuel may be provided to the DI fuel injectors even when one of the fuel storage tanks is substantially empty. In this way, degradation of the DI fuel injectors as a result of overheating may be reduced or prevented since the DI fuel injectors may be cooled by fuel flowing through the injectors. Further still, by diverting the first type of fuel (e.g. gasoline) to the DI fuel injectors when there is substantially none of the second type of fuel (e.g. ethanol, ethanol/gasoline), the engine may operate in a gasoline direct injection operating mode which may have improved efficiency over gasoline port injection operation, under some conditions. Fuel injection control strategies will be discussed in further detail below with reference to FIGS. 3-5

While low pressure pumps 242 and 250 are shown outside the respective fuel storage tanks, in an alternative example one or both of the pumps may be located within the respective fuel storage tanks. Further, the fuel systems may have different characteristics, such as different size tanks, different size pumps, different pump capacity, different pump pressure, different pump maximum flows, different on/off cycles (e.g., pump 250 may run more intermittently than pump 242), etc. Note, in some examples, only one pump may operate under some conditions. For example, if fuel from tank 234 is not needed, or not enabled (e.g., during cold start conditions), pump 250 may be deactivated (or not activated) while pump 242 operates. In this way, less battery power may be used, and less fuel vapors may be generated.

In some embodiments, the fuel system may include passages from both the first and second fuel storage tanks that may be used to selectively supply fuel to the PI fuel injectors via actuation of one or more valves. In such a configuration, different types of fuel may be supplied to the PI fuel injectors.

In some embodiments, the fuel system may include passages connecting the first fuel storage tank and the second fuel storage tank to enable fuel to be transferred between the first and second fuel storage tanks. For example, if the second fuel storage tank is empty, gasoline in the first fuel storage tank may be pumped into the second fuel storage tank. Optionally (or alternatively), fuel may be transferred between various regions of the fuel system via gravity.

Figure 2B:
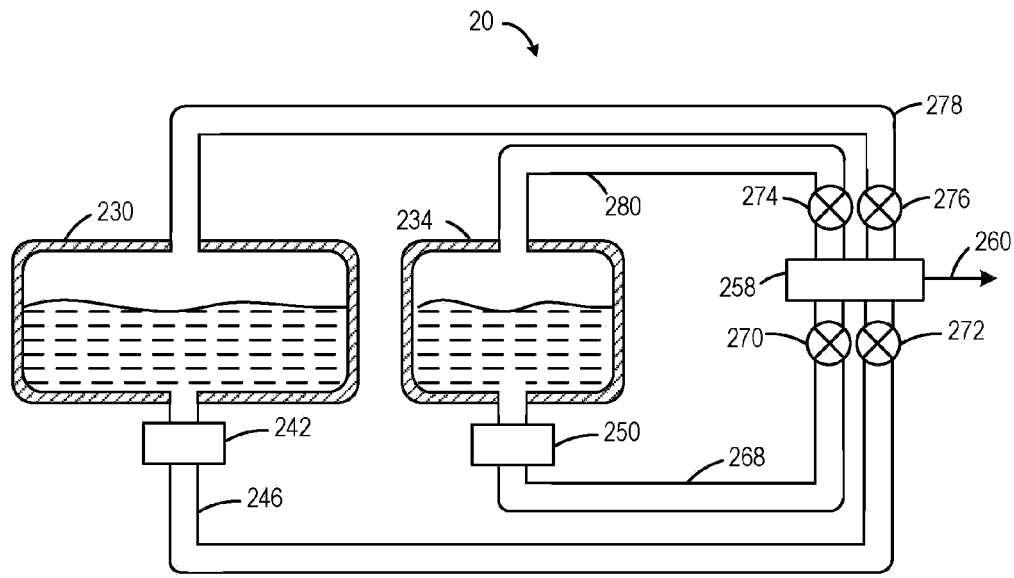
FIG. 2b is a schematic view of another embodiment of a fuel system of the present disclosure.

In some embodiments of fuel system 20, each fuel storage tank may include separate fuel delivery and return lines controlled by different valves. As shown in FIG. 2b, fuel system 20 may include first fuel storage tank 230 in communication with passage 246 leading to valve 272 and second fuel storage tank 234 in communication with passage 268 leading to valve 270. Actuation of valves 270 and 272 may control delivery of fuel from the respective fuel storage tanks to high pressure pump 258 and the DI system.

Further, fuel system 20 may include fuel return passage 278 in communication with first fuel storage tank 230 and fuel return passage 280 in communication with second fuel storage tank 234. Fuel may be purged from the DI system via actuation of valves 274 and 276. Specifically, actuation of valve 274 may purge fuel into second fuel storage tank 234 and actuation of valve 272 may purge fuel into first fuel storage tank 230. It will be appreciated that in some embodiments fuel may be purged via the high pressure fuel pump or another pump of the fuel system. In some embodiments, fuel may be transferred via gravity. By including selectively controlled return lines to each of the fuel storage tanks, the direct injection fuel system may be purged without having to inject fuel into the cylinder and each of the fuel types may be returned to their designated tanks with reduced mixing of the fuel types. In this way, fuel economy performance may be improved.

In some embodiments, the fuel system may include, for the fuel storage tanks, a returnless-type fuel system, a return-type fuel system, or combinations thereof.

Figure 2C:
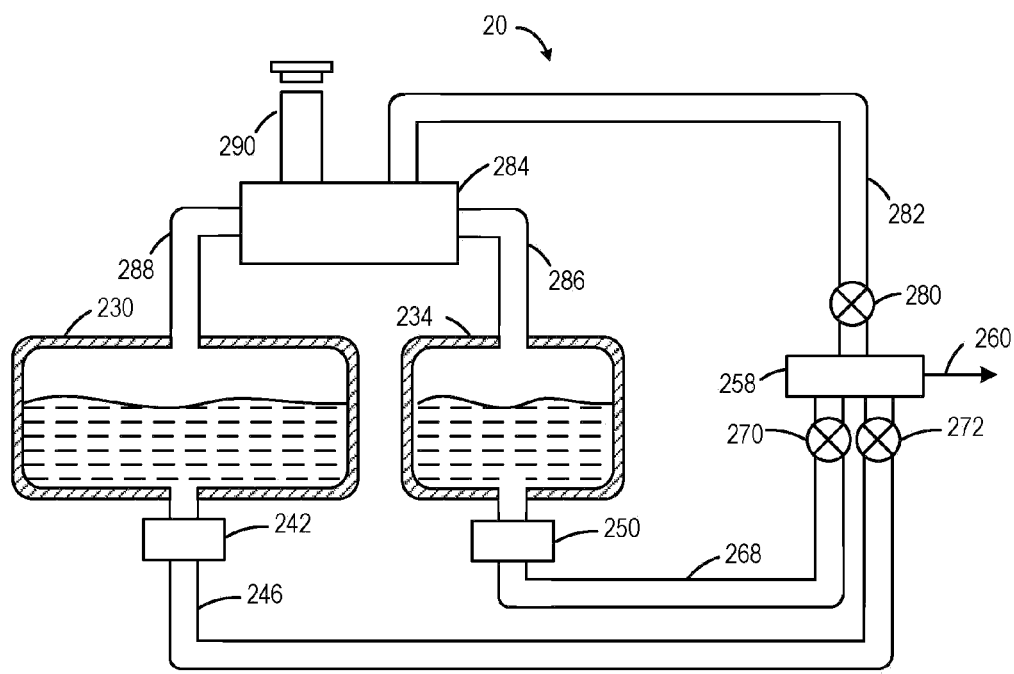
FIG. 2c is a schematic view of yet another embodiment of a fuel system of the present disclosure.

In some embodiments, fuel system 20 may be configured to receive a blended liquid fuel and substantially separate two or more different types of liquid fuels from the blended liquid fuel into the fuel storage tanks. As shown in FIG. 2c, fuel system may receive a blended liquid fuel (e.g., E85) via filling tube 290. The fuel may be separated by separator 284 and a first fuel type may be supplied to first fuel storage tank 230 via passage 288 and a second fuel type may be supplied to second fuel storage tank 234 via passage 286. In one example, E85 is supplied to the fuel system and the fuel separator separates gasoline and ethanol from an E85 blend and the gasoline is supplied to the first fuel storage tank and the ethanol is supplied to the second fuel storage tank.

Further, the fuel system may include a single return passage 282 and corresponding valve 280 that are configured to purge fuel from the DI system to fuel separator 284. The fuel separator may separate the purged fuel into the appropriate fuel storage tank.

In some embodiments, the fuel separator may be positioned at the exit of a fuel storage tank storing a blended fuel and the separator may separate the blended fuel into different types of fuel.

In some embodiments, the fuel system may include a primary fuel storage tank with a fuel separation layer and different types of fuels may be separated into different regions of the primary fuel storage tank. In such a configuration, fuel purged from the DI system may be returned to the primary fuel storage tank.

It will be appreciated that various fuel supply regulating components discussed above may be included in a fuel supply control device. In one example, one or more of the fuel pumps and valves regulating flow in the fuel supply passages may be included in the fuel supply control device.

As discussed above, the engine system may operate in a variety of different combustion modes due, in part, to the use of multiple fuel injectors to inject different types of fuel into cylinders of the engine via direct injection and/or port injection. Furthermore, the ability of the fuel delivery system to selectively supply different types of fuel to the DI fuel injectors, under varying conditions, may be used to advantage. In one example, the versatility of the fuel delivery system may be used to reduce the amount of time to warm-up emission control device(s) of a vehicle upon startup. Strategies for improved emission control device warm-up will be discussed in further detail herein with reference to FIGS. 3 and 4.

Figure 3:
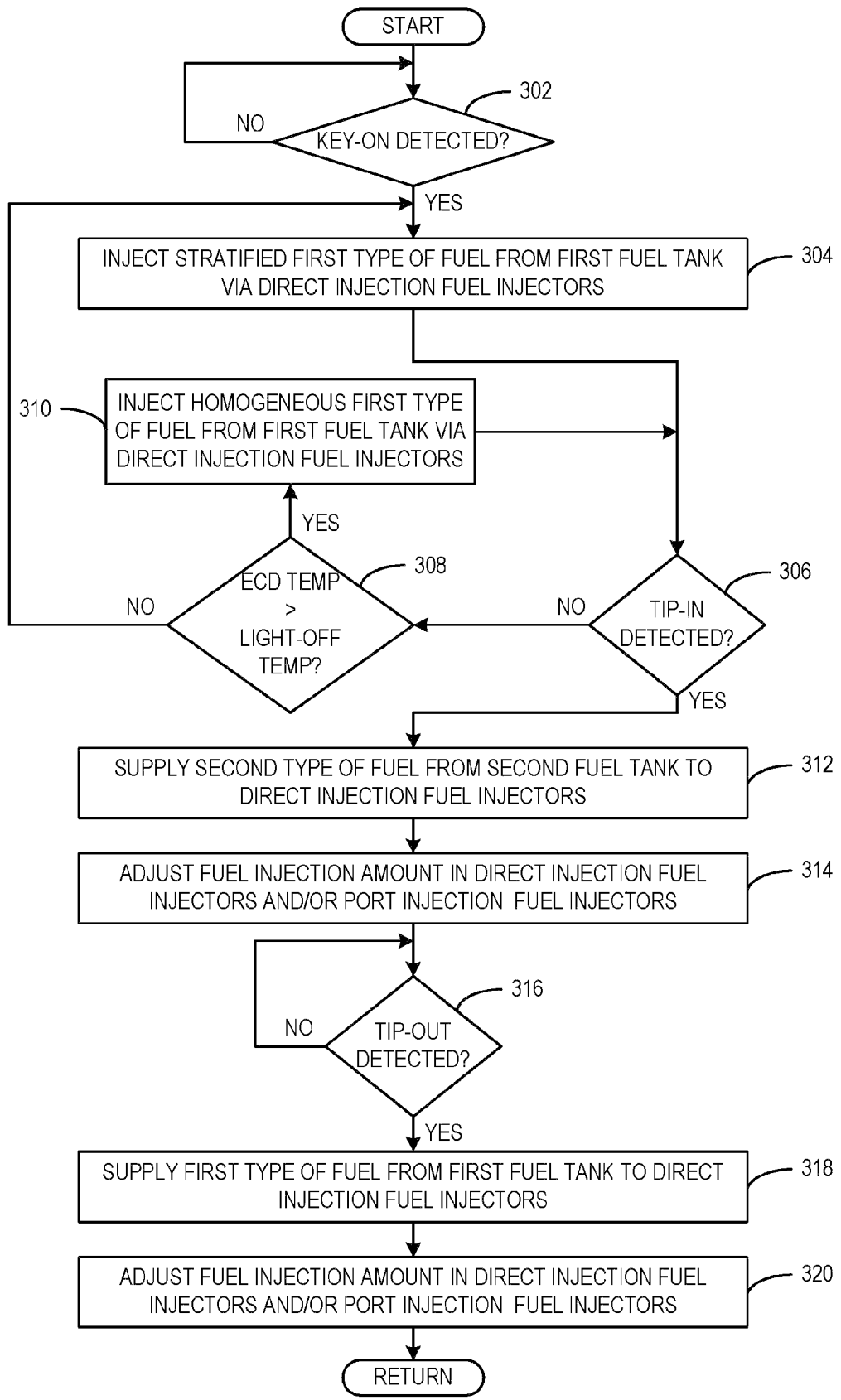
FIG. 3 is a flowchart of an embodiment of a method of improving exhaust system warm-up by supplying different types of fuel, under different operating conditions, to direct injection fuel injectors of an engine system, for enhanced operation of the engine system.

FIG. 3 shows a flowchart depicting an example fuel control strategy for improved exhaust system warm-up at vehicle startup and improved efficiency of engine operation across the operating range of the engine. In one example, the method may be applied to an engine system configured to supply different types of fuel to DI fuel injectors. In some examples, the engine may include a compression device such as a turbocharger, for example. Further, cylinders of the engine system may include multiple fuel injectors and at least one of the fuel injectors may be selectively supplied with different types of fuel, such as the engine system configurations shown in FIGS. 1 and 2. More particularly, in this example, the engine system may be configured to inject a first type of fuel (e.g. gasoline) from a first fuel storage tank via PI fuel injectors and at least some of either the first type of fuel (e.g. gasoline) or a second type of fuel (e.g. ethanol) from a second fuel storage tank may be selectively supplied to DI fuel injectors for direct injection into cylinders of the engine.

It will be appreciated that the example method may be applied to other suitable engine system configurations. For example, the method may be applied to an engine system configuration that includes a fuel separator to separate fuel to different fuel storage tanks. As another example, the PI fuel injectors may be omitted and the engine may only include one or more DI fuel injectors per cylinder. Further, it will be appreciated the first and second fuel types may be any suitable types of fuel or fuel blends.

The flowchart begins at 302, where the method may include detecting a key-on condition. In other words, the method may include detecting a driver commanded vehicle/engine startup. If the key-on condition is not detected the method may continue polling for the key-on condition. Otherwise, if the key-on condition is detected the flowchart moves to 304.

At vehicle startup, the temperature of emissions control device(s) in the vehicle's exhaust system may be below an operating or light-off temperature. Thus, it may be desirable to heat the emissions control device(s) in a quick manner in order to reduce tailpipe emissions. Therefore, at 304, the method may include performing stratified fuel injections of gasoline via the DI fuel injectors. Gasoline may be provided to the DI fuel injectors from a first fuel storage tank. Mild stratification may be enabled by direct injection, using separate injection events during an intake stroke (for a homogeneous mixture which is approximately stoichiometric) and late in the compression stroke (to add extra fuel near the spark plug). In particular, the stratified injection(s) may result in a locally rich mixture near the spark plug that improves combustion stability, and therefore enables additional spark retard for increased exhaust heat that may be transferred to emission control devise(s) for improved warm-up. It will be appreciated that, under some conditions, at vehicle start-up, gasoline may be supplied to the DI fuel injectors and the PI fuel injectors. Moreover, gasoline may be directly injected at startup, because gasoline may vaporize at a lower temperature relative to ethanol resulting in greater combustion stability.

Performing stratified injections of gasoline (or another fuel type that vaporizes in cold conditions) to quickly heat the exhaust system may be particularly beneficial in turbocharged engine applications because the added mass and surface area of a turbocharger may reduce the heat available at the catalyst emission control devise(s) for warm-up purposes.

Next at 306, the method may include detecting if a tip-in of the accelerator pedal or other increase in engine output has occurred. In some examples, the increase in engine output may be commanded to produce high output or high engine load. In some examples, tip-in may be detected based on a change in pedal position exceeding a threshold change (or pedal position). If a sufficient tip-in of the accelerator pedal is detected the flowchart moves to 312. Otherwise, the flowchart moves to 308.

Next at 308, the method may include determining if the temperature of the emissions control device(s) (ECD) is greater than a threshold light-off temperature. The threshold light-off temperature may include a temperature at which an emissions control device suitably reduces the less desirable emissions exhausted from cylinders of the engine. If it is determined that the emissions control device(s) has/have not reached the threshold light-off temperature, the flowchart returns to 304 and stratified injections of gasoline may be performed to continue warm-up of the emissions control device(s). Otherwise, if it is determined that the emissions control device(s) has/have reached the threshold light-off temperature, and the flowchart moves to 310.

Optionally (or alternatively), in some embodiments, it may be determined if a temperature of the cylinder has reached a threshold temperature. In one example, the threshold temperature is the temperature at which ethanol vaporizes well enough to achieve a desired combustion stability level. Temperature in a cylinder can be estimated by counting the number of combustion events and the air charge temperature. An empirically determined table that is indexed by the number of combustion events in a particular cylinder and air charge temperature is one way to estimate temperature in a cylinder. When the estimated cylinder temperature reaches the predetermined level the second fuel is delivered to the cylinder's direct injector.

Furthermore, in some embodiments, upon reaching a cylinder temperature at which ethanol may be stably combusted, the DI fuel injector may transition from using gasoline from the first fuel storage tank to injecting stratified ethanol from the second fuel storage tank by increasing the ethanol fraction (EF). In this way, the combustion benefits of stratified ethanol may be applied to the temperature range between stable combustion of ethanol and warm-up of the emissions control device. Note that injections of stratified ethanol from the second storage tank may be performed at an engine start where the cylinder temperature reaches the predetermined level.

At 310, the method may include performing homogeneous fuel injections of gasoline from the first fuel storage tank via the DI fuel injectors. Since the emissions control device has reached a light-off temperature, additional heat does need not be generated from direct injection of stratified gasoline and homogeneous operation may be performed.

Turning to 312, the method may include supplying ethanol to the DI fuel injectors from the second fuel storage tank. In one example, ethanol may be supplied to the DI system in response to detection of a commanded high engine load condition, so that ethanol may be directly injected to abate engine knock during the high engine load condition. In particular, ethanol has a higher heat of vaporization relative to gasoline, so ethanol directly injected into the combustion chamber may provide increased air charge cooling to abate engine knock and allowing for an increase in the amount of boost resulting in increased engine output. It will be appreciated that gasoline from the first fuel storage tank may not be supplied to the DI system when ethanol from the second fuel storage tank is supplied to the DI system, such as at accelerator pedal tip-in, for example.

It will be appreciated that supplying fuel (e.g. ethanol or gasoline) to the DI fuel injectors may include actuation of one or more valves in the fuel system to stop the flow of the first fuel type and start the flow of the second fuel type. In some embodiments, the fuel system may include separate supply lines with separate valves to the DI system and each of the valves may be actuated to supply the appropriate fuel type to the DI system. In some embodiments, a single valve may selectively control which fuel type is supplied to the DI system.

Next at 314, the method may include adjusting the fuel injection amount injected by the DI fuel injectors and/or the PI fuel injectors. For example, the amount of fuel injected by the DI fuel injectors may be increased in order to quickly purge the DI system of gasoline. Cooperatively, the amount of fuel injected via the PI fuel injectors may be reduced as the amount of fuel injected via the DI fuel injectors is increased in order to maintain a desired air/fuel ratio. In some examples, the desired air/fuel ratio may include stoichiometric air/fuel ratio.

Under some conditions, the amount of fuel injected via the DI fuel injectors may be initially increased to purge the DI system and then reduced to another desired level once the gasoline has been purged from the DI system. In some examples, the adjusted fuel amount may be injected for a predetermined duration. In some examples, the adjusted fuel amount may be injected for a duration based on a model of the fuel system volume and fuel flow rates in and out of the system. Under some conditions, the amount of fuel injected via the DI fuel injectors may be initially increased to purge the DI system and may be maintained at that amount to avoid knock. In one particular example, where gasoline and ethanol may be selectively supplied to the DI system, the method may increase the desired ethanol fraction (EF) during a tip-in, until the DI system is purged of gasoline.

Next at 316, the method may include detecting a tip-out of the accelerator pedal or other decrease in engine output. In one example, the decrease in engine output may be commanded to low output or low engine load. In one example, tip-out is detected based on a change in pedal position exceeding a threshold change (or pedal position). If a tip-out to lower load is detected the flowchart moves to 318. Otherwise, the flowchart returns to 316 and polls for a tip-out of the accelerator pedal.

At 318, the method may include supplying gasoline from the first fuel storage tank to the DI fuel injectors. Gasoline may be provided to the DI system at tip-out and ethanol may be purged from the DI system in preparation for engine shutdown and an ensuing engine restart. As discussed above, at a cold start condition, stratified gasoline may be directly injected to speed up emissions control device warm-up, since gasoline has a lower evaporation temperature than ethanol and thus may improve combustion stability at lower temperatures relative to ethanol. It will be appreciated that ethanol from the second fuel storage tank may not be supplied to the DI system when gasoline from the first fuel storage tank is supplied to the DI system, such as at accelerator pedal tip-out, for example.

Next at 320, the method may include adjusting the fuel injection amount injected by the DI fuel injectors and/or the PI fuel injectors. For example, the amount of fuel injected by the DI fuel injectors may be increased in order to quickly purge the DI system of ethanol. Cooperatively, the amount of fuel injected via the PI fuel injectors may be reduced as the amount of fuel injected via the DI fuel injectors is increased in order to maintain a desired air/fuel ratio. In some examples, the desired air/fuel ratio may include stoichiometric air/fuel ratio. In one particular example, where gasoline and ethanol may be selectively supplied to the DI system, the method may increase the desired gasoline fraction (GF) during a tip-out, until the DI system is purged of ethanol. Note that at low engine loads, gasoline may be injected by only the DI fuel injectors, only the PI fuel injectors, or both the direct injection fuel injector and the PI fuel injectors.

By supplying ethanol to the DI system at tip-in and supplying gasoline to the DI system at tip-out, ethanol may be directly injected to abate engine knock at high load conditions and gasoline may be directly injected to improve exhaust system warm-up at cold start conditions. In this way, increased engine output at high load may be provided and tailpipe emissions at engine start may be reduced.

Furthermore, it will be appreciated that by changing fuel supplied to the DI system at each tip-in and tip-out, the DI system may be suitably purged during vehicle operation and no additional engine run time is necessary in order to purge the DI system at key-off. In this way, fuel economy performance of the vehicle may be improved.

Note that, in the above described flowchart, the use of gasoline and ethanol are merely nonlimiting examples of a first fuel type and second fuel type. Further, note that various other fuels or blends of fuels may be used in an engine system according to the above described flowchart. The different fuels or fuel blends may have different heats of vaporization which may dictate when and how they are used during engine operation.

Figure 4:
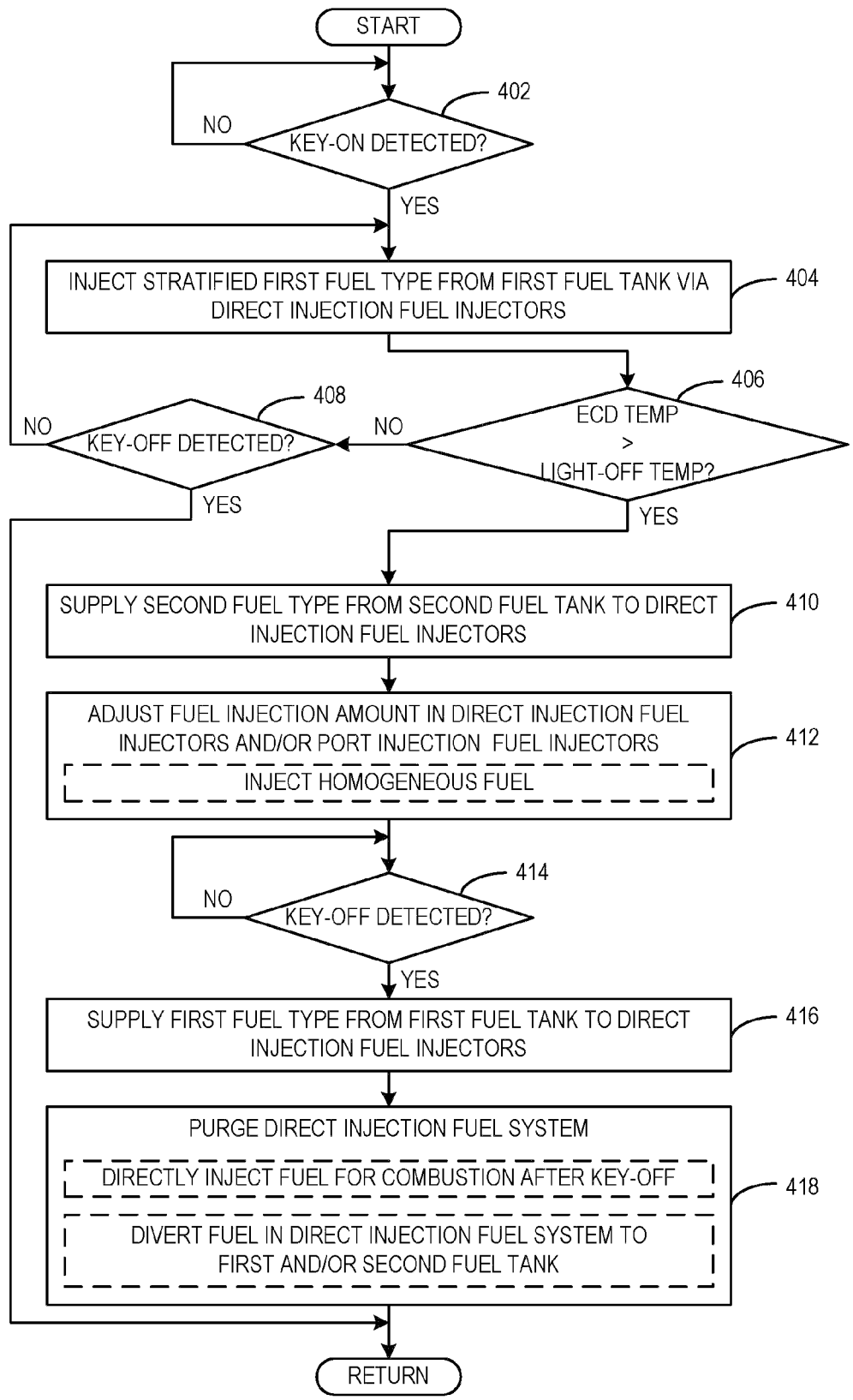
FIG. 4 is a flowchart of another embodiment of a method of providing different types of fuel, under different operating conditions, to direct injection fuel injectors of an engine system, for enhanced operation of the engine system.

FIG. 4 shows a flowchart depicting another example fuel control strategy for improved exhaust system warm-up at vehicle startup and improved efficiency of engine operation across the operating range of the engine. Like the method described in FIG. 3, this example method may be applied to different engine configurations that include cylinders having DI fuel injectors, such as the engine system configuration shown in FIGS. 1 and 2. In this example, the engine system may be configured to inject a first type of fuel (e.g. gasoline) from a first fuel storage tank via PI fuel injectors and at least some of either the first type of fuel (e.g. gasoline) or a second type of fuel (e.g. ethanol) from a second fuel storage tank may be supplied to DI fuel injectors for direct injection into cylinders of the engine. In this strategy the DI system may be filled with ethanol during vehicle operation after warm-up of the exhaust system and the DI system may be purged and filled with gasoline at shutdown, in preparation for a possible ensuing cold start condition.

The flowchart begins at 402, where the method may include detecting a key-on condition. In other words, the method may include detecting a driver commanded vehicle/engine startup. If the key-on condition is not detected the flowchart may return to 402 and continue polling for the key-on condition. Otherwise, if the key-on condition is detected the flowchart moves to 404.

At vehicle startup, the temperature of emissions control device(s) in the vehicle's exhaust system may be below an operating or light-off temperature. Thus, it may be desirable to heat the emissions control device(s) in a quick manner in order to reduce tailpipe emissions. Therefore, at 404, the method may include performing stratified fuel injections of gasoline via the DI fuel injectors.

Next at 406, the method may include determining if the temperature of the emissions control device(s) (ECD) is greater than a threshold light-off temperature. If it is determined that the emissions control device(s) has/have reached the threshold light-off temperature, the flowchart moves to 410. Otherwise, if it is determined that the emissions control device(s) has/have not reached the threshold light-off temperature, the flowchart moves to 408 where the method may include determining if a key-off condition has occurred. In other words, is vehicle, and more particularly, engine shutdown desired. If the key-off condition is not detected the method returns to 404 and stratified injections of gasoline may be performed to continue warm-up of the emissions control device(s). Otherwise, if the key-off condition is detected the flowchart returns and the engine is shutdown without any purging of the DI fuel system.

Turning to 410, the method may include supplying ethanol from the second fuel storage tank to the DI fuel injectors in response to the emissions control device(s) reaching a light-off temperature. In an alternative embodiment, the first fuel may be delivered to the cylinder's direct injector until the cylinder temperature reaches a predetermined level. In one example, the predetermined level is such that ethanol vaporizes well enough to achieve a desired combustion stability level.

Furthermore, in some embodiments, upon reaching a cylinder temperature at which ethanol may be stably combusted, the DI fuel injector may transition from using gasoline from the first fuel storage tank to injecting stratified ethanol from the second fuel storage tank by increasing the ethanol fraction (EF).

It will be appreciated that supplying fuel (e.g. ethanol or gasoline) to the DI fuel injectors may include actuation of one or more valves in the fuel supply control device of the fuel system to stop the flow of the first fuel type and start the flow of the second fuel type. In some embodiments, the fuel supply control device may include separate supply lines with separate valves to the DI system and each of the valves may be actuated to supply the appropriate fuel type to the DI system. In some embodiments, a single valve may selectively control which fuel type is supplied to the DI system.

In some embodiments, ethanol may be supplied to the DI system during light load conditions, in which case, arbitration may be used to determine the ratio of gasoline to ethanol in the DI system so that fuel injection amounts may be adjusted based on the arbitrated ratio in order to generate a desired air/fuel ratio. In one example, the arbitration may consider engine load, air/fuel ratio, time since fuel supply valve actuation, fuel injection mode, etc. To transition between fuel types quickly, the amount of fuel injected via the DI fuel injectors may be temporarily increased.

In some embodiments, ethanol may be supplied to the DI system in response to detection of a first tip-in of the acceleration pedal. By transitioning between fuel types at an accelerator tip-in, a transition between fuel types may be performed quickly, and the fuel type being injected by the DI fuel injectors may be known with a high accuracy quickly (as opposed to determining a blend of fuel types in the DI system).

Next at 412, the method may include adjusting the fuel injection amount injected by the DI fuel injectors and/or the PI fuel injectors. In one example, the DI fuel injectors transition from stratified operation to homogeneous operation. The DI system may transition from directly injecting stratified gasoline and injecting little or no gasoline via port injection for exhaust warming, to providing port injected gasoline for primary combustion and selectively injecting ethanol via the DI fuel injectors at high engine load conditions for knock abatement purposes. Thus, in one example, adjusting the fuel injection amount injected by the DI fuel injectors and/or the PI fuel injectors may include reducing the amount of fuel injected by the DI fuel injectors and increasing the amount of fuel injected by the PI fuel injectors. Under some conditions (e.g., low load), fuel may be injected by only the PI fuel injectors. Further, the fuel injection amount may be adjusted to meet a desired air/fuel ratio, such as a stoichiometric air/fuel ratio, for example.

In this example method, the DI system may be supplied with ethanol from the second fuel storage tank during vehicle operation after warm-up of the exhaust system (or warm-up of the cylinder). Further, in preparation for a cold restart condition, ethanol may be purged from the DI system and gasoline from the first fuel storage tank may be supplied to the DI system at shutdown of the vehicle. Thus, at 414, the method may include determining if a key-off condition has occurred. In other words, is vehicle, and more particularly, engine shutdown desired. If the key-off condition is not detected the method may continue polling for the key-off condition. Otherwise, if the key-off condition is detected the flowchart moves to 416.

At 416, the method may include supplying gasoline from the first fuel storage tank to the DI fuel injectors. Gasoline may be supplied to the DI system at engine shutdown in preparation for an ensuing cold start condition.

Next at 418, the method may include purging the DI system of ethanol. In some embodiments, purging the DI system may include stopping the supply of ethanol from the second fuel storage tank to the DI system and performing direct injection of ethanol for combustion after key-off in order to combust the remaining ethanol in the DI system. Engine design and operation may be modified/adjusted in order to reduce purge time after shutdown. In some examples, the DI system may be designed to hold a relatively small fuel volume so that purge time may be reduced. Further, in some examples, the engine may be adjusted for inefficient operation during shutdown. For example, spark timing may be retarded and/or the engine speed may be increased and/or actions may be performed to combust the remaining ethanol at an increased rate so that purge time may be reduced.

In some embodiments, purging the DI system may include diverting ethanol in the DI system to at least one of the first and second fuel storage tank. In one example, a fuel return line having a control valve may connect the DI system with the first tank or the second tank and the control valve may be actuated upon key-off to purge the DI system. The purge valve may be opened for a predetermined duration to purge the ethanol before being closed. In a particular example, the return line is connected to the first fuel storage tank containing gasoline, and ethanol is purged to the first fuel storage tank since many types of gasoline contain a blend of ethanol and gasoline. This control strategy avoids the cost of additional return lines to return purged fuel to the fuel storage tank(s).

In another example, the DI system may be connected with the first fuel storage tank via a first return line and the DI system may be connected with the second fuel storage tank via a second return line. Thus, during purging, the second fuel line may be used to purge ethanol from the DI system and when it is determined that most of the ethanol has been purged out, the second return line may be closed and the first return line may be opened so that the remaining blend of ethanol and gasoline may be purged to the first tank containing gasoline. This control strategy avoids additional run time and fuel consumption after key-off. By only purging ethanol upon engine shutdown, the risk of engine knock during each tip-in may be avoided since ethanol remains in the DI system during vehicle operation. In this way, engine knock may be abated across the range of operating conditions of the vehicle and emissions control device(s) may be heated quickly at a cold start condition.

Note that, in the above described flowchart, the use of gasoline and ethanol are merely nonlimiting examples of a first fuel type and second fuel type. Further, note that various other fuels or blends of fuels may be used in an engine system according to the above described flowchart. The different fuels or fuel blends may have different heats of vaporization which may dictate when and how they are used at engine cold start.

The methods described above with reference to FIGS. 3 and 4 facilitate an engine which uses both ethanol and gasoline to achieve improved operating efficiency and emissions performance across the operating range of the engine. In particular, during cold start and warm-up, the methods make use of mild stratification with gasoline direct injection for enhanced fuel evaporation/mixing, combustion stability, and increased exhaust heat to warm up the catalyst. Further, at light loads, the methods make use of port injected gasoline for minimum ethanol consumption and good air-fuel mixing. Further still, at high loads, the methods make use of port injected gasoline and directly injected ethanol for improved knock control with minimum ethanol consumption and increased engine output.

Figure 5:
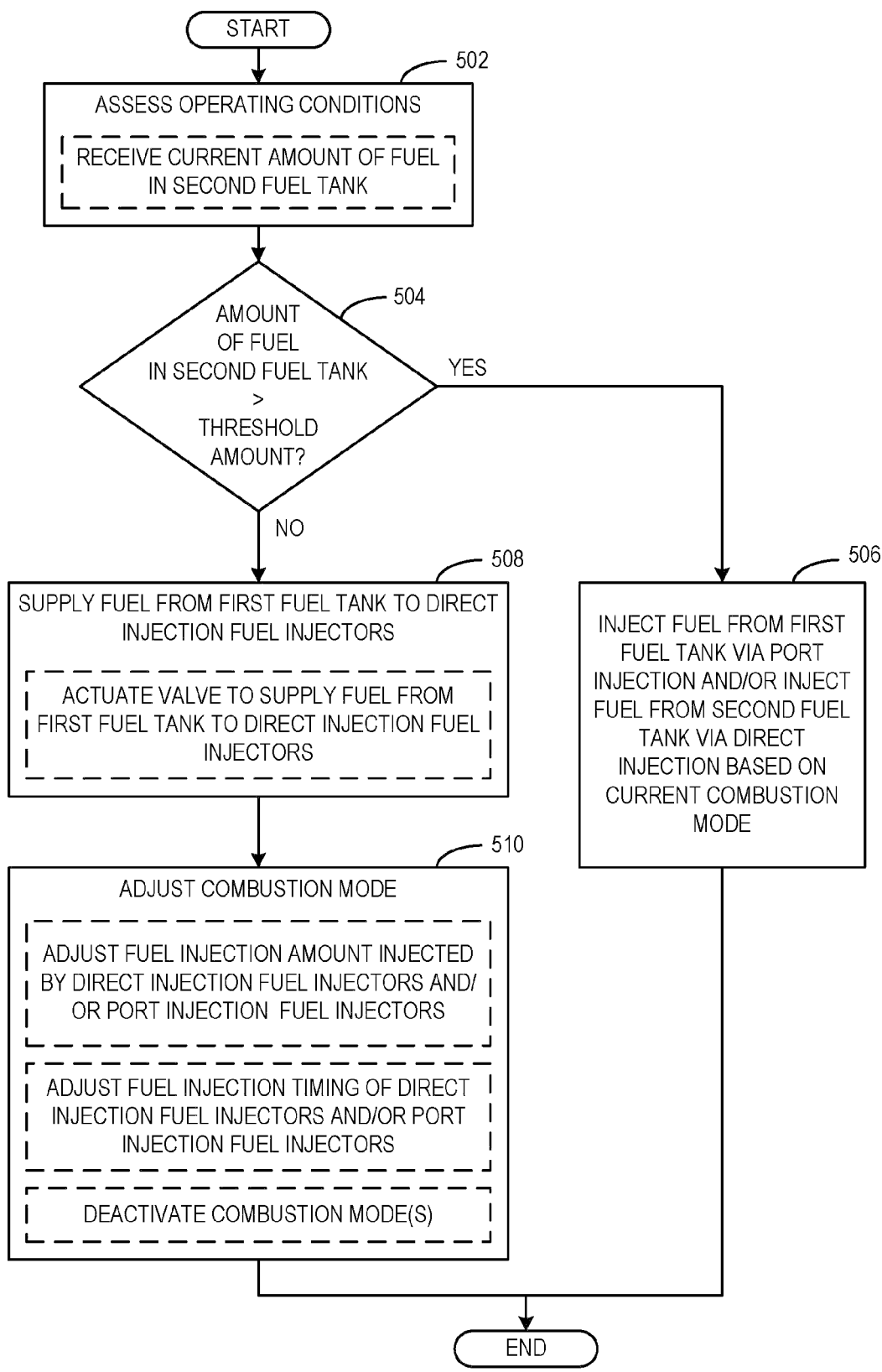
FIG. 5 is a flowchart of an embodiment of a method of reducing the likelihood of overheating of direct injection fuel injectors of an engine system by switching the source from which fuel is supplied to the direct injection fuel injectors.

FIG. 5 shows a flowchart depicting an example fuel control strategy for increasing the robustness of DI fuel injectors in an engine configuration that is capable of supplying fuel from different fuel storage tanks to the DI fuel injectors. In particular, the method may reduce or prevent degradation of the DI fuel injectors as a result of overheating by supplying fuel to the DI fuel injectors and injecting fuel via the DI fuel injectors even when a fuel storage tank supplying fuel to the DI fuel injectors is low or substantially empty.

This example method may be applied to different engine configurations that include fuel from different sources being supplied to the same or different fuel injectors, such as the engine system configuration shown in FIGS. 1 and 2. In the engine system, a first type of fuel (e.g. gasoline) from a first fuel storage tank may be supplied to the PI fuel injectors for port injection into cylinders of the engine and at least some of either the first type of fuel (e.g. gasoline) from the first tank or a second type of fuel (e.g. ethanol) from a second fuel storage tank may be supplied to DI fuel injectors for direct injection into cylinders of the engine.

The flowchart begins at 502, where the method may include assessing operating conditions of the engine system, including current, past, and/or predicted future operating conditions. As described herein, operating conditions may include, but are not limited to, one or more of the following: a fuel amount of the first fuel storage tank, a fuel amount of the second fuel storage tank, valve orientation of a direct injection fuel supply passage valve, engine indication of fuel supplied to the port injection fuel injector, indication of fuel supplied to the direct injection fuel injector, indication that either of the first or second fuel storage tanks has been misfueled, engine speed, engine load, combustion mode, air/fuel ratio, ambient conditions such as air temperature and pressure, spark timing, and vehicle speed, among other operating states of the engine system. In a particular example, a second fuel storage tank primarily supplies fuel to the DI fuel injectors, and thus, assessing operating conditions may include receiving a current amount of fuel in the second fuel storage tank.

Next at 504, the method may include determining if the amount of fuel in the second fuel storage tank that is supplying fuel to the DI fuel injectors exceeds a threshold amount. For example, the threshold amount may be substantially no fuel in the second fuel storage tank. If it is determined that the amount of fuel in the second fuel storage tank exceeds the threshold amount the flowchart moves to 506. Otherwise, the amount of fuel in the second fuel storage tank does not exceed the threshold amount and the flowchart moves to 508.

At 506, the method may include injecting fuel from the first fuel storage tank via port injection and/or injecting fuel from the second fuel storage tank via direct injection based on the current combustion mode. As one example, at low engine load, the PI fuel injectors inject gasoline for combustion and the DI fuel injectors do not perform fuel injections in order to conserve ethanol. As another example, at high engine load, the PI fuel injectors inject gasoline for combustion and the DI fuel injectors inject ethanol for engine knock abatement and/or for cooling of the DI fuel injectors. As yet another example, the DI fuel injectors inject gasoline for combustion, such as for example at vehicle startup.

At 508, the method may include supplying fuel from the first fuel storage tank to the DI fuel injectors. Fuel may be supplied from the first fuel storage tank to the DI fuel injectors in order to reduce or prevent overheating of the DI fuel injectors. Supplying fuel from the first fuel storage tank may include actuating one or more valves that route fuel from the first fuel storage tank to the direct injection fuel system. Further, supplying fuel from the first fuel storage tank may include actuating one or more valves to prevent fuel that may be transferred into the second fuel storage tank from flowing to the DI fuel injectors. In some embodiments, a single valve may be actuated to route fuel from the first tank and prevent fuel from the second tank being supplied to the DI fuel injectors.

Furthermore, supplying fuel from the first fuel storage tank to the DI fuel injectors may result in switching fuel types. For example, the first fuel storage tank may be filled with gasoline and the second fuel storage tank may be filled with ethanol. Thus, when it is determined that there is little or no ethanol in the second fuel storage tank the DI fuel injectors may be supplied with gasoline. Further, when it is determined that there is little or no gasoline in the first fuel storage tank the DI fuel injectors may be supplied with ethanol from the second fuel storage tank.

At 510, the method may include adjusting a mode of combustion. The mode of combustion may be adjusted based on the type of fuel supplied to the DI fuel injectors. In particular, if switching between fuel storage tanks results in a change in fuel type being supplied to the DI fuel injectors, the combustion mode may be adjusted to compensate for the change in fuel type.

Adjusting the combustion mode may include adjusting the fuel injection amount of the DI fuel injectors and/or the fuel injection amount of the PI fuel injectors based on the type of fuel being supplied to the DI system. Further, adjusting the combustion mode may include adjusting the fuel injection timing of the DI fuel injectors and/or the PI fuel injectors based on the type of fuel supplied to the DI system.

In one example, if a tank containing ethanol is low or runs out and gasoline is supplied to the direct injection system, under some conditions, the combustion mode may be adjusted to perform direct injection of gasoline, as opposed to port injection of gasoline. In particular, at low engine loads, the DI fuel injectors may perform stratified injections of gasoline. Thus, the amount of gasoline injected by the DI fuel injectors may be reduced and the fuel injecting timing may be retarded (e.g., during compression). Correspondingly, the PI fuel injectors do not inject gasoline. Further, at moderate engine loads, the fuel injection amount may be adjusted for stoichiometry and the fuel injection timing may be adjusted to inject fuel during an intake stroke for homogenous combustion. Further still, at high engine loads, the fuel injection amount may be adjusted to operate slightly rich and the fuel injection timing may be adjusted to inject fuel during an intake stroke for homogenous combustion. By adjusting the combustion mode to directly inject gasoline fuel efficiency and emissions control of the engine may be improved during some operating conditions.

Note that at moderate and high engine loads, fuel injection may be performed via direct injection and/or port injection.

In another example, if a tank containing gasoline is low or runs out and ethanol is supplied to the direct injection system, the combustion mode may be adjusted to perform direct injection of ethanol. Fuel injection amount and timing may be adjusted to operate lean, at stoichiometry, or slightly rich based on engine load.

Adjusting the combustion mode may include temporarily deactivating a particular combustion mode based on the fuel type used in the combustion mode. For example, if ethanol runs out, a combustion mode where ethanol is directly injected and gasoline is port injected may be deactivated, and a high turbocharger boost mode may also be deactivated. As another example, if gasoline runs out, a combustion mode where stratified direct injection of gasoline is performed may be deactivated.

Furthermore, a combustion mode may be reactivated in response to the fuel storage tank being filled with an amount of fuel that is beyond the threshold amount.

It will be appreciated that references to fuel storage tanks discussed above may also apply to different outlets of a fuel separation device. For example, a first type of fuel stored in a first fuel storage tank and a second type of fuel stored in a second fuel storage tank may correspond to a first type of fuel flowing from a first outlet of a fuel separation device and a second type of fuel flowing from a second outlet of the fuel separation device.

Note the above described method is one nonlimiting example of selectively supplying different types of fuel from different sources to the direct injection fuel injector and/or the port injection fuel injector according to different operating conditions. Moreover, it will be appreciated that different types of fuel from different sources may be selectively supplied to the direct injection fuel injector and/or the port injection fuel injector according to various different operating conditions.

For example, a vehicle system may be configured such that a PI fuel injector may be supplied with fuel from at least one of a first fuel storage tank and a second fuel storage tank and a DI fuel injector may be selectively supplied with fuel from one of the first fuel storage tank and the second fuel storage tank. In one example, where the PI fuel injector is supplied with the first type of fuel from the first fuel storage tank and the DI fuel injector is supplied with the second type of fuel from the second fuel storage tank, the DI fuel injector may not receive fuel based a disruption in the fuel supply system (e.g., a blocked fuel supply valve or supply line). The disruption may be detected in various manners. For example, a sensor positioned proximate to the DI fuel injector (e.g., at the DI fuel rail or high pressure fuel pump) may detect that no fuel is being supplied from the second fuel storage tank, and thus the DI fuel injector may be supplied with fuel from the first fuel storage tank. As another example, the disruption in the fuel supply system may be detected based on a variation in air/fuel ratio as a result of less fuel being supplied and/or injected by the DI fuel injector, and thus the DI fuel injector may be supplied with fuel from the first fuel storage tank.

In another example, where the PI fuel injector is supplied with the first type of fuel from the first fuel storage tank and the DI fuel injector is supplied with the second type of fuel from the second fuel storage tank, the second fuel storage tank may be mis-fueled (e.g., filled with an unexpected type of fuel, contaminated, etc.). The mis-fuel may be detected in various manners. For example, a sensor in the second fuel tank may detect a type of fuel supplied to the tank. As another example, the indication of a mis-fuel may be supplied by a vehicle operator or service provider via an input. As yet another example, the mis-fuel may be detected based on changes in operating parameters such as engine output, emissions, air/fuel ratio, etc. In response to receiving an indication of a mis-fuel, the DI fuel injector may be supplied with the second type of fuel from the second fuel storage tank. By supplying at least some fuel to the DI fuel injector from a different source based on an indication that fuel is being supplied to DI fuel injector, fuel may be supplied to the DI fuel injector at various conditions to cool the DI fuel injector. In this way, overheating of the DI fuel injector may be reduced.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
a first fuel storage tank;
a second fuel storage tank;
at least one cylinder;
a port injection fuel injector to inject fuel into an intake passage in operative communication with the at least one cylinder, the port injection fuel injector being supplied with a first type of fuel from the first fuel storage tank;
a direct injection fuel injector to inject fuel directly into the at least one cylinder, the direct injection fuel injector being selectively supplied with the first type of fuel from the first fuel storage tank and a second type of fuel from the second fuel storage tank;
an emissions control device positioned to receive emissions exhausted from the at least one cylinder; and
a control system configured to cause the first type of fuel from the first fuel storage tank to be supplied to the direct injection fuel injector in response to an engine start condition, said control system further configured to supply the second type of fuel from the second fuel storage tank based on a temperature of the emissions control device exceeding a threshold temperature, and configured to cause the direct injection fuel injector to be supplied with fuel from the first fuel storage tank when an amount of fuel in the second fuel storage tank is less than a threshold amount.

2. The vehicle system of claim 1, further comprising purging said direct injection fuel injector of said second fuel type with said first fuel type in response to an operator tip-out, wherein said first fuel type includes gasoline and wherein said second fuel type includes methanol.

3. The vehicle system of claim 1, further comprising:
a fuel separator in operative communication with the first fuel storage tank and the second fuel storage tank, the fuel separator configured to separate a fuel blend including the first type of fuel and the second type of fuel, such that the first type of fuel is supplied to the first fuel storage tank and the second type of fuel is supplied to the second fuel storage tank.

4. The vehicle system of claim 1, wherein during purging of a fuel from the direct injection fuel injector, the amount of fuel injected by the direct injection fuel injector is increased for a predetermined duration and the fuel is purged via combustion.

5. The vehicle system of claim 1, further comprising:
a fuel supply control device having at least one valve configured to regulate supply of at least one of the first type of fuel from the first fuel storage tank and the second type of fuel from the second fuel storage tank, and the control system is configured to cause actuation of the at least one valve of the fuel supply control device to control supply of fuel to the direct injection fuel injector.

6. A vehicle system comprising:
a fuel system containing a first type of fuel and a second type of fuel
at least one cylinder;
a port injection fuel injector to inject fuel into an intake passage in operative communication with the at least one cylinder, the port injection fuel injector being supplied with a first type of fuel from the fuel system;
a direct injection fuel injector to inject fuel directly into the at least one cylinder, the direct injection fuel injector being selectively supplied with at least one of the first type of fuel and the second type of fuel from the fuel system;
an emissions control device positioned to receive emissions exhausted from the at least one cylinder; and
a control system configured to cause the first type of fuel from the fuel system to be supplied to the direct injection fuel injector in response to an engine start condition, to cause the second type of fuel to be supplied from the fuel system to the direct injection fuel injector based on a temperature of the emissions control device exceeding a threshold temperature, and to cause the second type of fuel to be supplied from the fuel system to the direct injection fuel injector based on an increased in engine output even when the temperature is below the threshold temperature, and to cause the first type of fuel to by injected by the direct injection fuel injector when an amount of fuel stored in a fuel storage tank is less than a threshold amount.

7. The vehicle system of claim 6, wherein the control system further adjusts a timing of the direct injection fuel injector based on a type of fuel injected.

8. The vehicle system of claim 6, wherein the control system deactivates a combustion mode when the amount of fuel stored in the fuel storage tank is less than a threshold amount.

9. A method of fueling an engine, comprising:
supplying a first fuel type from a first fuel tank to an injector in response an engine start condition; and
supplying a second fuel type from a second fuel tank to said injector in response to a temperature of an emissions control device exceeding a threshold temperature; and
supplying said first fuel type to said injector in response to a request to stop said engine.

10. The method of claim 9, wherein the second fuel type from the second fuel tank is not supplied to said injector when the first fuel type from the first fuel tank is being supplied to said injector and the first fuel type from the first fuel tank is not supplied to said injector when the second fuel type from the second fuel tank is being supplied to said injector.

11. The method of claim 9, where said injector is a direct injector and where said first fuel includes gasoline and where said second fuel includes methanol.

12. The method of claim 9, further comprising:
supplying the first fuel type from the first fuel tank to the injector when an amount of fuel in said second fuel tank is less than a threshold amount and deactivating a combustion mode.

13. The method of claim 12, further comprising:
increasing a fuel injection amount of a direct injection fuel injector for a predetermined duration following a commanded decrease in engine output.

14. The method of claim 9, where said injector is a direct injector, and where the engine further includes a second port injector is supplied with said first fuel, and where an amount of fuel injected from said direct injector is increased and an amount of fuel injected from said port injector is to purge said first fuel from said direct injector.

15. The method of claim 14, further comprising:
purging fuel from the injector to at least one of the first fuel tank and the second fuel tank for a predetermined duration in respond to the request to stop the engine.

16. The method of claim 9, further comprising:
performing combustion of air and fuel injected via the injector for a predetermined duration in response to the request to stop said engine.

17. The method of claim 9, wherein the threshold temperature is a light-off temperature of the emissions control device.

18. The method of claim 9, further comprising supplying said second fuel type from said second fuel tank to said injector in response to an increase of an operator input pedal of a vehicle.

19. The method of claim 9, wherein the engine further includes a port injection fuel injector supplied with the first fuel type from the first fuel tank, the method further comprising:

in response to the temperature of the emissions control device exceeding the threshold temperature, performing fuel injection via the port injection fuel injector at low load condition.

20. The method of claim 9 further comprising boosting intake-air.

* * * * *